(12) United States Patent
Ashida et al.

(10) Patent No.: US 10,976,205 B2
(45) Date of Patent: Apr. 13, 2021

(54) DYNAMIC QUANTITY MEASURING APPARATUS HAVING A STRAIN SENSOR DISPOSED IN A GROOVE

(71) Applicant: Hitachi Automotive Systems, Ltd., Hitachinaka (JP)

(72) Inventors: Kisho Ashida, Hitachinaka (JP); Atsuo Soma, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 117 days.

(21) Appl. No.: 15/761,732

(22) PCT Filed: Jul. 29, 2016

(86) PCT No.: PCT/JP2016/072253
§ 371 (c)(1),
(2) Date: Mar. 20, 2018

(87) PCT Pub. No.: WO2017/056673
PCT Pub. Date: Apr. 6, 2017

(65) Prior Publication Data
US 2018/0356302 A1 Dec. 13, 2018

(30) Foreign Application Priority Data

Sep. 30, 2015 (JP) .............................. JP2015-192517

(51) Int. Cl.
*G01L 1/18* (2006.01)
*G01L 9/00* (2006.01)
*G01B 7/16* (2006.01)

(52) U.S. Cl.
CPC .................. *G01L 1/18* (2013.01); *G01B 7/18* (2013.01); *G01L 9/0055* (2013.01)

(58) Field of Classification Search
CPC ........ G01L 1/18; G01L 1/2206; G01L 1/2287; G01L 1/2293; H01L 29/84
See application file for complete search history.

(56) References Cited

U.S. PATENT DOCUMENTS 3,782,182 A * 1/1974 Starr .................. G01B 7/18
73/782
3,913,391 A * 10/1975 Kurtz ................. G01L 1/18
73/776

(Continued)

FOREIGN PATENT DOCUMENTS

| JP | 2005-114443 A | 4/2005 |
|----|---|---|
| JP | 4566227 B2 | 10/2010 |
| WO | WO 2009/028283 A1 | 3/2009 |

OTHER PUBLICATIONS

Japanese-language International Search Report (PCT/ISA/210) issued in PCT Application No. PCT/JP2016/072253 with English translation dated Sep. 27, 2016 (two (2) pages).

(Continued)

*Primary Examiner* — Tran M. Tran
(74) *Attorney, Agent, or Firm* — Crowell & Moring LLP

(57) ABSTRACT

A dynamic quantity measuring apparatus includes a strain sensor, a resin member, a strain body, and a boding portion. The strain sensor has a plurality of piezoresistance elements and a plurality of electrode pads formed on a surface of a semiconductor substrate. The resin member for electrical wiring is provided with a plurality of wires electrically connected to the plurality of electrode pads. The strain body is joined to a back surface of the strain sensor. The bonding portion is configured to bond the resin member for electrical wiring to the strain body. A groove is provided in a region of the resin member for electrical wiring located in a vicinity of the strain sensor.

8 Claims, 15 Drawing Sheets

(56) References Cited

U.S. PATENT DOCUMENTS

| | | | | |
|---|---|---|---|---|
| 5,207,102 | A * | 5/1993 | Takahashi | G01L 19/0084 29/621.1 |
| 5,209,120 | A * | 5/1993 | Araki | G01L 19/147 29/621.1 |
| 5,407,501 | A * | 4/1995 | Koen | G01L 9/0042 156/292 |
| 6,148,673 | A * | 11/2000 | Brown | G01L 19/0038 257/676 |
| 6,347,040 | B1 * | 2/2002 | Fries | G06K 9/0002 341/20 |
| 6,388,311 | B1 * | 5/2002 | Nakashima | H01L 23/49503 257/666 |
| 6,570,485 | B1 * | 5/2003 | Stratton | G01L 19/02 29/621.1 |
| 6,829,945 | B2 * | 12/2004 | Gilch | G01B 7/18 73/777 |
| 6,906,412 | B2 * | 6/2005 | Furukubo | B81B 7/0048 257/698 |
| 6,938,492 | B2 * | 9/2005 | Tsukada | G01L 19/04 29/592 |
| 7,053,312 | B2 * | 5/2006 | Hishinuma | H01L 21/4853 174/254 |
| 7,552,644 | B2 * | 6/2009 | Haase | G01L 1/2287 73/760 |
| 7,707,894 | B2 * | 5/2010 | Sumigawa | G01B 7/16 73/727 |
| 7,755,231 | B2 * | 7/2010 | Kataoka | G01D 5/2013 29/596 |
| 7,886,607 | B2 * | 2/2011 | Fink | G01L 1/165 73/716 |
| 7,934,430 | B2 * | 5/2011 | Irving | G01L 1/2262 73/795 |
| 8,438,931 | B2 | 5/2013 | Kazama et al. | |
| 9,190,537 | B2 * | 11/2015 | Ashida | G01B 7/16 |
| 9,310,265 | B2 * | 4/2016 | Shimoyama | G01L 1/04 |
| 9,459,162 | B2 * | 10/2016 | Miyajima | G01B 7/18 |
| 9,581,427 | B2 * | 2/2017 | Ashida | G01B 7/18 |
| 9,709,377 | B2 * | 7/2017 | Ohta | G01B 7/18 |
| 9,891,124 | B2 * | 2/2018 | Suzuki | G01L 9/0044 |
| 10,345,161 | B2 * | 7/2019 | Caltabiano | G01L 1/04 |
| 10,386,216 | B2 * | 8/2019 | Ogata | G01F 1/69 |
| 10,481,023 | B2 * | 11/2019 | Shimokawa | G01L 9/0048 |
| 2005/0034529 | A1 * | 2/2005 | Tang | G01N 33/54346 73/777 |
| 2005/0072247 | A1 * | 4/2005 | Reinhart | G01L 9/0064 73/777 |
| 2005/0087020 | A1 * | 4/2005 | Ueyanagi | G01L 19/143 73/753 |
| 2007/0222875 | A1 * | 9/2007 | Moriya | H01L 24/97 348/294 |
| 2007/0240519 | A1 * | 10/2007 | Shimazu | G01B 7/18 73/777 |
| 2008/0289432 | A1 | 11/2008 | Ohta et al. | |
| 2009/0199650 | A1 * | 8/2009 | Shimazu | G01B 7/18 73/777 |
| 2011/0203385 | A1 * | 8/2011 | Huels | G01B 7/16 73/847 |
| 2011/0227178 | A1 | 9/2011 | Kazama et al. | |
| 2015/0296622 | A1 * | 10/2015 | Jiang | G01L 1/2268 361/750 |

OTHER PUBLICATIONS

Japanese-language Written Opinion (PCT/ISA/237) issued in PCT Application No. PCT/JP2016/072253 dated Sep. 27, 2016 (three (3) pages).

* cited by examiner

CROSS SECTION CC IN FIG. 3

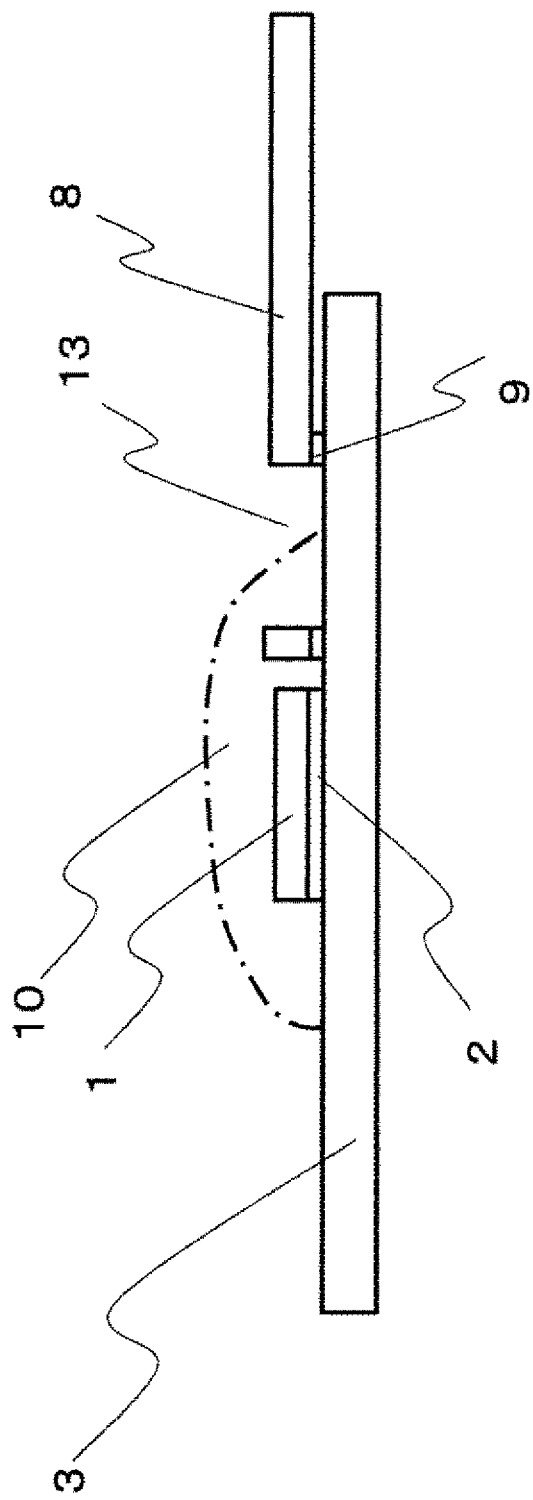

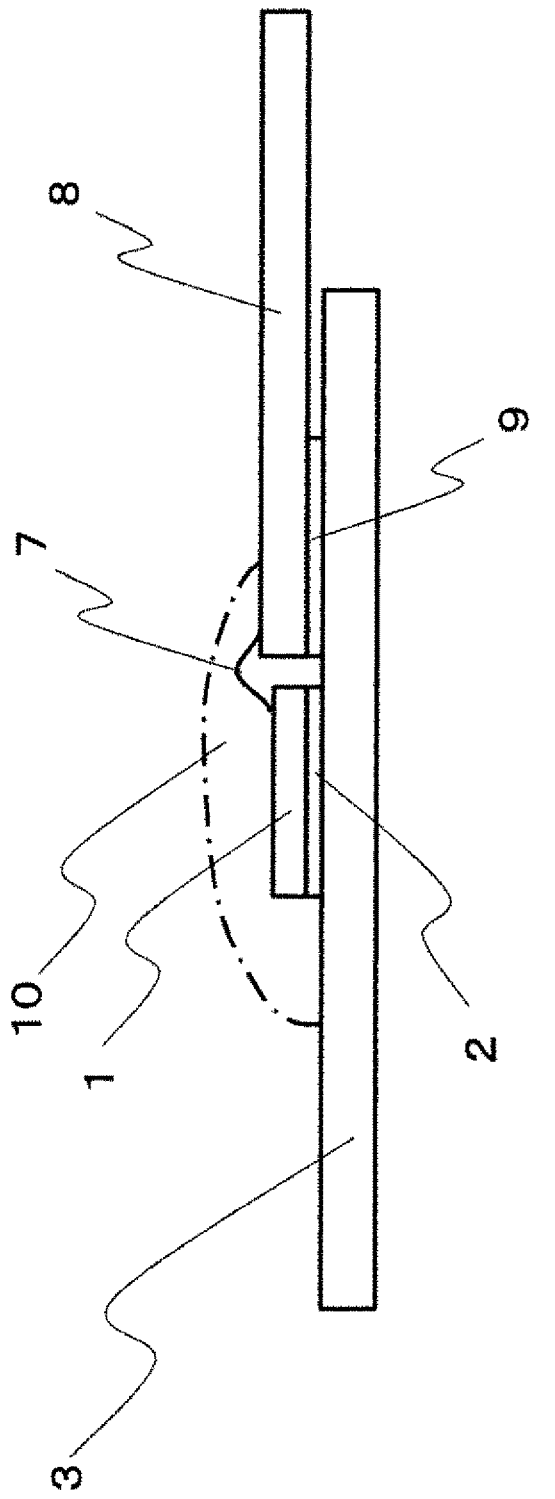

CROSS SECTION CC IN FIG. 3

DYNAMIC QUANTITY MEASURING APPARATUS HAVING A STRAIN SENSOR DISPOSED IN A GROOVE

TECHNICAL FIELD

The present invention relates to a dynamic quantity measuring apparatus using a semiconductor strain sensor capable of measuring strain and stress of a structural member.

BACKGROUND ART

There is a known semiconductor strain sensor (hereinafter referred to as a strain sensor), for example, as disclosed in Patent Document 1 as a sensor to detect strain generated in various kinds of structural members. A strain sensor is a device utilizing a semiconductor piezoresistance formed by doping a semiconductor such as silicon (Si) with impurities. The strain sensor can measure minute strain because a resistance change rate to strain is several tens times of a strain gauge using a metal thin film.

Additionally, since resistance change is little in the strain gauge of the metal thin film, an external amplifier to amplify an obtained electric signal is necessary. Since the strain sensor has large resistance change, an obtained electric signal can be used without using any external amplifier, and furthermore, an amplifier circuit can be built in a semiconductor chip of the strain sensor, and therefore, application and convenience of use are expected to be largely broadened.

Additionally, as a module using this strain sensor, for example, there is a strain sensor module obtained by attaching a strain sensor to a member such as a metal plate as disclosed in Patent Document 2. A module suitable for a strain state desired to be measured can be implemented by changing a structure of the member to which the strain sensor is attached.

CITATION LIST

Patent Literature

PTL 1: JP 2005-114443 A
PTL 2: WO 2009/028283 A

SUMMARY OF INVENTION

Technical Problem

FIGS. 1 and 2 are schematic views of a strain sensor module 4 in the related art. FIG. 1 is a plan view of this module, and FIG. 2 is a cross-sectional view taken along a line AA in FIG. 1. This module includes a strain sensor 1, a wiring portion 8 electrically connected to the strain sensor 1, a strain body 3 on which the strain sensor 1 is mounted via a joining material 2, and a sealing resin 10 adapted to seal the strain sensor 1. The wiring portion 8 is attached to the strain body 3 via a bonding portion 9. The wiring portion 8 is a member to supply power to the strain sensor 1 and output a measured strain value, and generally, a flexible wiring board, a glass epoxy substrate, or the like is used. The reason is that complicated wiring patterns can be easily manufactured at low cost. Thus, a resin member for electrical wiring is generally used for a strain sensor module.

Next, a problem of the strain sensor module in the related art will be described. Generally, the wiring portion 8 and the bonding portion 9 are formed of a resin material, but the resin material has characteristics to absorb moisture and expand. In the case of this module, the wiring portion and the bonding portion formed of a resin material absorb moisture and expand. Due to such expansion, tensile strain 12 (thick arrow) is generated in a Y direction parallel to the strain sensor as illustrated in FIGS. 3 and 4. As a result, tensile strain is also generated in the strain body 3 to which the wiring portion 8 is attached, and therefore, tensile strain is also generated in the strain sensor 1 and a sensor output value results in fluctuating.

Thus, in the case of using this module for a long period, sensor output fluctuates due to moisture absorption of the wiring portion 8 and the bonding portion 9, and therefore, there is a problem in which measurement accuracy of the strain sensor module is deteriorated.

Therefore, the present invention is directed to providing a module structure in which fluctuation of sensor output caused by moisture absorption of a resin member used for a member for electrical wiring or the like in a strain sensor module structure is suppressed and strain measurement accuracy is improved.

Solution to Problem

A dynamic quantity measuring apparatus according to an aspect of the present invention includes: strain sensor having a plurality of piezoresistance elements and a plurality of electrode pads formed on a surface of a semiconductor substrate; a resin member for electrical wiring, provided with a plurality of wires electrically connected to the plurality of electrode pads; a strain body joined to a back surface of the strain sensor; and a bonding portion adapted to bond the resin member for electrical wiring to the strain body, wherein a groove is provided in a region of the resin member for electrical wiring located in the vicinity of a chip.

Advantageous Effects of Invention

According to the present invention, sensor output value hardly fluctuates even in a case where the resin member for electrical wiring absorbs moisture, and therefore, the strain sensor module excellent in strain measurement accuracy can be provided.

BRIEF DESCRIPTION OF DRAWINGS

FIG. 6A is a cross-sectional view taken along a line AA in FIG. 5.
FIG. 6B is a cross-sectional view taken along a line BB in FIG. 5.

DESCRIPTION OF EMBODIMENTS

Embodiments of the present invention will be described below in detail based on the drawings. Note that a member having a same function will be denoted by a same reference sign and repetition of a description therefor will be omitted in all of the drawings to describe the embodiments.

First Embodiment

Figure 5:
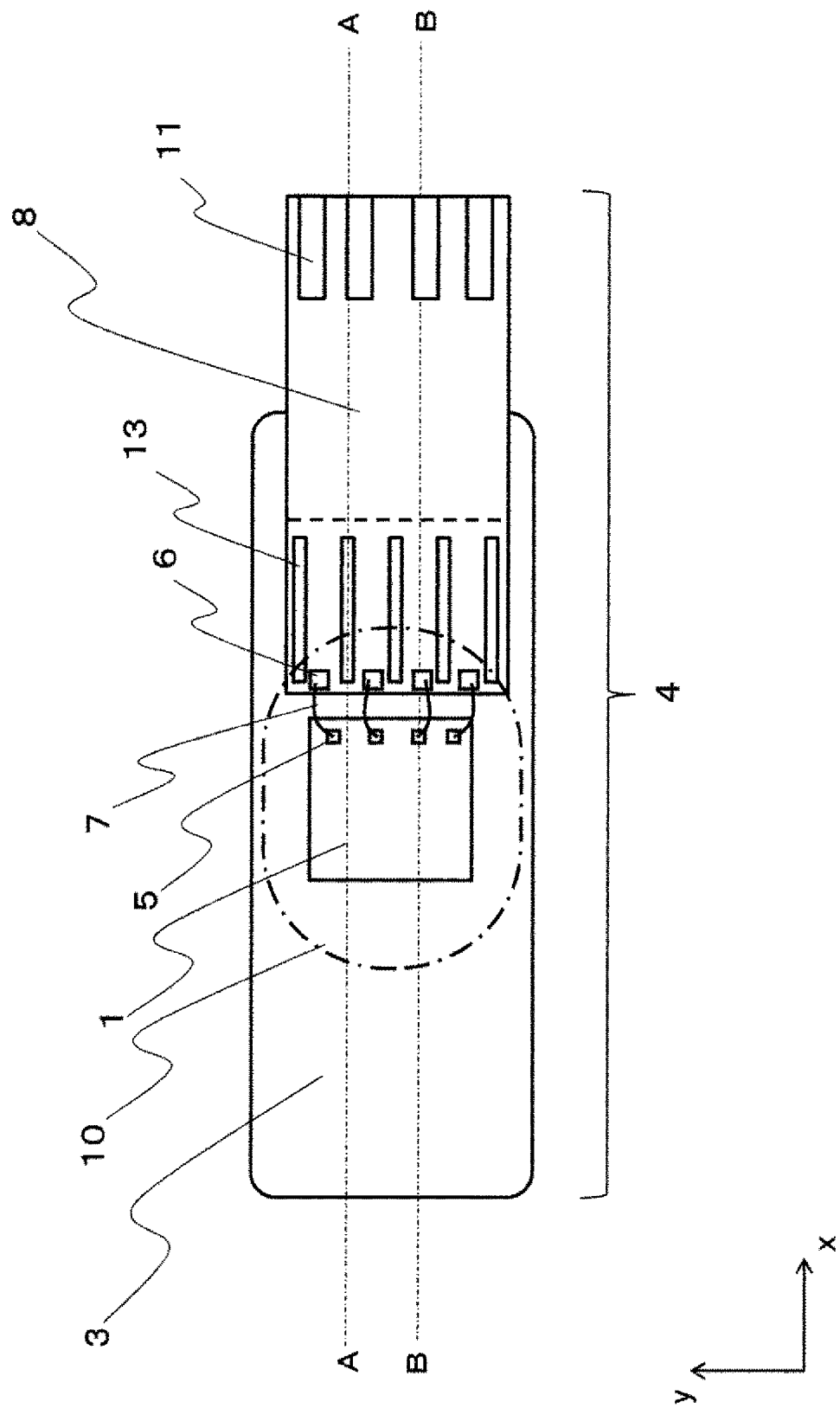
FIG. 5 is a plan view of a strain sensor module according to a first embodiment of the present invention.

First, a basic structure of a dynamic quantity measuring apparatus of the present embodiment will be described. FIG. 5 is a perspective plan view of a strain sensor module of the present embodiment. Additionally, FIGS. 6A and 6B are cross-sectional views taken along lines AA and BB in FIG. 5, respectively. Meanwhile, in FIG. 5, an outline of a sealing resin 10 is indicated by a dot-and-dash line in order to illustrate an internal structure of the sealing resin 10, and the internal structure viewed through the sealing resin 10 is illustrated. As illustrated in FIGS. 5, 6A, and 6B, the strain sensor module of the present embodiment includes a strain sensor 1, a wiring portion 8 (such as a flexible wiring board and a glass epoxy substrate) electrically connected to the strain sensor 1, a strain body 3 on which the strain sensor 1 is mounted via a joining material 2, and the sealing resin 10 adapted to seal the strain sensor 1.

Figure 7A:
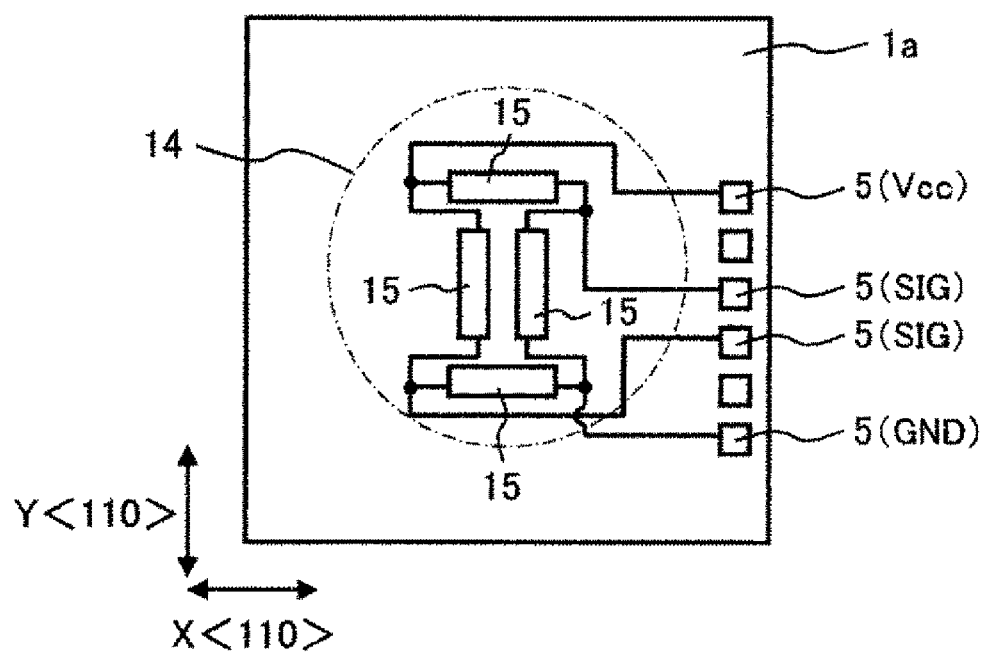
FIG. 7A is a plan view of the strain sensor.
Figure 7B:
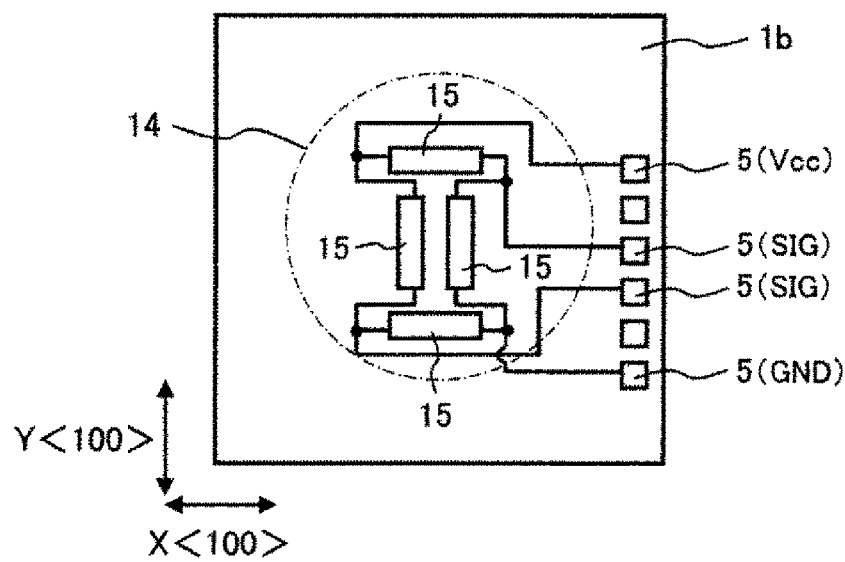
FIG. 7B is a plan view of the strain sensor.

FIGS. 7A and 7B are plan views schematically illustrating structures on a front surface side and a back surface side of the strain sensor 1 illustrated in FIGS. 5, 6A, and 6B. As illustrated in FIGS. 7A and 7B, the strain sensor 1 has the front surface (main surface) 1a and a back surface (main surface) 1b located on an opposite side of the front surface 1a. A metal film is formed on the back surface 1b of a sensor chip 1, and the back surface 1b is covered with a metal film. This metal film is formed of a stacked film (metal stacked film) in which, for example, titanium, nickel, gold (Ti, Ni, Au) are sequentially stacked from a semiconductor substrate side by a sputtering method, for example. Since the back surface 1b of the strain sensor 1 is thus covered with the metal film, it is possible to improve joining strength with the metal-made joining material 2 such as solder. Additionally, the front surface 1a and the back surface 1b each have a quadrilateral shape (quadrangle), and in examples illustrated in FIGS. 7A and 7B, each of the surfaces has a square shape with a side length of, for example, about 2 mm to 5 mm. Furthermore, the strain sensor 1 includes a plurality of resistive elements 15 (piezoresistive elements) formed in a sensor region 14 located in a central portion on the surface 1a side.

Additionally, the strain sensor 1 includes a plurality of electrodes (pads, electrode pads 5) formed in an input/output circuit region located more on a peripheral portion side than the sensor region 14 on the surface 1a side is. The plurality of electrodes (pads, electrode pads 5) is electrically connected to the plurality of resistive elements 15 (piezoresistive element). The plurality of resistive elements 15 is formed of impurity diffusion regions obtained by, for example, doping an element forming plane of a silicon substrate having a surface (100) with impurities and diffusing the impurities. The sensor chip 1 includes a detection circuit (strain detection circuit) in which, for example, four resistive elements 15 are electrically connected to form a Wheatstone bridge circuit, and resistance change of the resistive elements 15 caused by a piezoresistance effect is measured to detect strain.

Figure 7C:
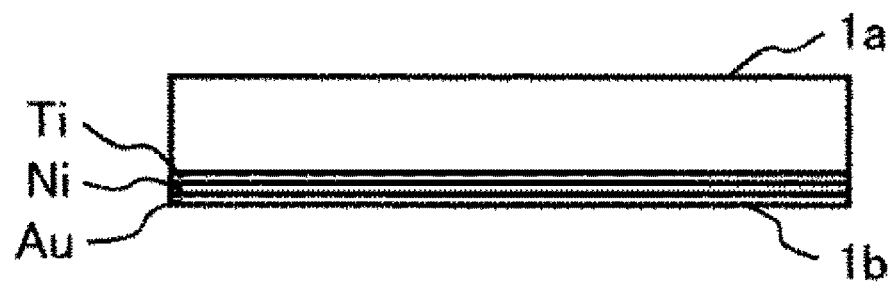
FIG. 7C is a side view of the strain sensor.

Furthermore, the detection circuit is connected to the plurality of electrode pads 5 via a plurality of wires. The plurality of electrode pads 5 serves as input/output terminals of the sensor chip 1, and for example, a terminal Vcc to supply power supply potential (first power supply potential) to the strain sensor 1, a terminal GND to supply reference potential (second power supply potential), and a terminal SIG to output a detection signal are included. Additionally, s layout of the plurality of resistive elements 15 constituting the detection circuit is not limited to aspects illustrated in FIG. 7A to FIG. 7C, but in the present embodiment, the following structure is applied. In other words, in the case where a semiconductor substrate (e.g., a silicon substrate made of silicon (Si)) included in the strain sensor 1 is a single crystal (silicon single crystal), an extending direction (longitudinal direction) of each of the plurality of resistive elements 15 constituting the detection circuit conforms to a direction <110> or a direction <100> of the semiconductor substrate including the surface (100) plane. For example, in the example illustrated in FIG. 7A, a four p-type diffusion regions (regions doped with impurities having p-type conductivity type) are formed on the semiconductor substrate (silicon substrate) included in the strain sensor 1 such that current flows along a crystal orientation of the direction <110> of the silicon single crystal (an X direction in FIG. 7A and a Y direction orthogonal to the X direction). In other words, in the sensor chip 1, four resistive elements 15 are formed by doping four places with the p-type impurities so as to extend along the crystal orientation of the direction <110> of the silicon single crystal of the silicon substrate.

Furthermore, in the example illustrated in FIG. 7B, four n-type diffusion regions (regions doped with impurities having n-type conductivity type) are formed on the semiconductor substrate (silicon substrate) included in the strain sensor 1 such that current flows along a crystal orientation of the direction <100> of the silicon single crystal (an X direction in FIG. 7B and a Y direction orthogonal to the X direction). In other words, in the strain sensor 1, four resistive elements 15 are formed by doping four places with the n-type impurities so as to extend along the crystal orientation of the direction <100> of the silicon single crystal of the silicon substrate.

As illustrated in FIGS. 7A and 7B, the strain sensor 1 in which the extending direction of each of the plurality of resistive elements 15 constituting the detection circuit conforms to the direction <110> direction or the direction <100> of the semiconductor substrate including the surface (100) can output a difference between strain in the X direction and strain in Y direction illustrated in FIGS. 7A and 7B, for example. Specifically, the difference between the strain in the X direction and the strain in the Y direction can be output as a potential difference from the terminals SIG illustrated in FIGS. 7A and 7B. A measurement method of thus outputting the difference between the strain in the X direction and the strain in the Y direction is advantageous from the viewpoint of reducing influence of thermal strain applied to the sensor chip 1.

In other words, since the strain sensor 1 is joined to a plurality of members (the strain body 3 and the joining material 2 in the case of FIG. 5) as illustrated in FIG. 5, thermal strain caused by a difference of a linear expansion coefficient in each of the members is generated when a measurement environment temperature is changed. Since this thermal strain is a noise component different from strain to be measured, it is preferable to reduce the influence of thermal strain.

Here, as illustrated in FIGS. 7A and 7B, in the case where a planar shape of the strain sensor 1 has a square shape, influence of the thermal strain is approximately the same in the X direction and the Y direction. Therefore, for example, in the case of detecting strain generated in the X direction, a strain amount caused by thermal strain is canceled and strain to be measured can be selectively detected by outputting a difference between the strain in the X direction and the strain in the Y direction.

In short, since influence caused by thermal strain can be reduced by using the strain sensor 1, unevenness of a strain value caused by change of the environmental temperature can be reduced. Additionally, each member such as the resistive element 15 or the electrode pad 5 constituting the strain sensor 1 can be formed by applying a known manufacturing technique of a semiconductor device, and therefore, an element and wiring can be easily miniaturized. Furthermore, a manufacturing cost can be reduced by improving manufacturing efficiency.

Next, the joining material 2 will be described. The joining material 2 is provided in a manner covering an entire back surface of the strain sensor 1 and a part of a side surface of the strain sensor 1. In other words, a peripheral edge portion of the joining material 2 spreads to the outside of the side face of the strain sensor 1 and may form a fillet. The joining material 2 is not limited to a metal material from the viewpoint of fixing the strain sensor 1 and the strain body 3, and a resin adhesive material such as a thermosetting resin can also be used.

Next, as illustrated in FIG. 5, the wiring portion 8 including a plurality of wires electrically connected to the plurality of electrode pads 5 of the strain sensor 1 is fixed the strain body 3. The wiring portion 8 has a structure in which a wiring portion formed of a plurality of metal patterns is sealed inside a resin film, the plurality of wires is partly exposed from opening portions provided in a part of the resin film, and the exposed portions constitute a plurality of terminals 6. The wiring portion 8 is a member necessary to supply power to the strain sensor 1 and output a measured strain value, and also is a resin member for electrical wiring generally formed of a resin material such as a flexible wiring board or a glass epoxy substrate. The reason for using such a member is that a complicated wiring pattern can be easily manufactured at low cost. Additionally, the wiring portion 8 is connected to the strain body 3 via the bonding portion 9.

In the present embodiment, a slit 13 is provided in a region of the wiring portion 8 located in the vicinity of the strain sensor. Here, the region of the wiring portion 8 in the vicinity of the strain sensor includes, for example, a region from an end portion of the wiring portion 8 adjacent to the strain sensor 1 to a center portion of the wiring portion 8. The slit 13 completely penetrates front and back surfaces of the wiring portion 8 and is formed in a manner such that a longitudinal direction of the slit is perpendicular to the strain sensor 1 (X direction in the drawing). Meanwhile, the slit 13 is manufactured so as not to cut a metal wiring portion (not illustrated) formed in the wiring portion 8. Here, a slit may also be provided in the bonding portion 9 in a manner similar to the slit 13 provided in the wiring portion 8.

In the case where the slit 13 is thus provided, rigidity of a member of the wiring portion 8 in a direction parallel to the strain sensor 1 (Y direction in the drawing) can be largely reduced. Therefore, even in the case where the wiring portion 8 absorbs moisture, force applied to the strain body 3 connected to the wiring portion 8 is little, and therefore, almost no strain in the Y direction is generated in the strain body 3 and a sensor output value hardly fluctuates (in other words, measurement accuracy of the strain sensor module is not deteriorated). The number of the slits 13 is not particularly limited, but as described above, it is desirable to form the slits as many as possible under the condition that the metal wiring portion is not cut. The reason is that the more the number of the slits is, the more rigidity of a member can be reduced.

Additionally, in the example illustrated in FIG. 5, the plurality of electrode pads 5 of the strain sensor 1 and the plurality of terminals 6 of the wiring portion are electrically connected via a plurality of Au wires 7 (conductive members). The wire 7 is a gold wire (Au wire) having a wire diameter of about 10 µm to 200 µm, for example, and is sealed with the sealing resin 10. Since the wire 7 is covered with the sealing resin 10, a short circuit between adjacent wires can be prevented. Additionally, as illustrated in FIG. 5, one end portion of the wiring portion 8 is fixed to the strain body 3, but the other end portion is formed with a connector not illustrated, for example, and electrically connected to a control circuit (illustration omitted) or the like to control strain measurement, for example. Furthermore, as far as input/output current can be transmitted between the strain sensor 1 and an external device not illustrated, the wiring portion 8 is not limited to the aspect illustrated in FIG. 5.

Figure 8:
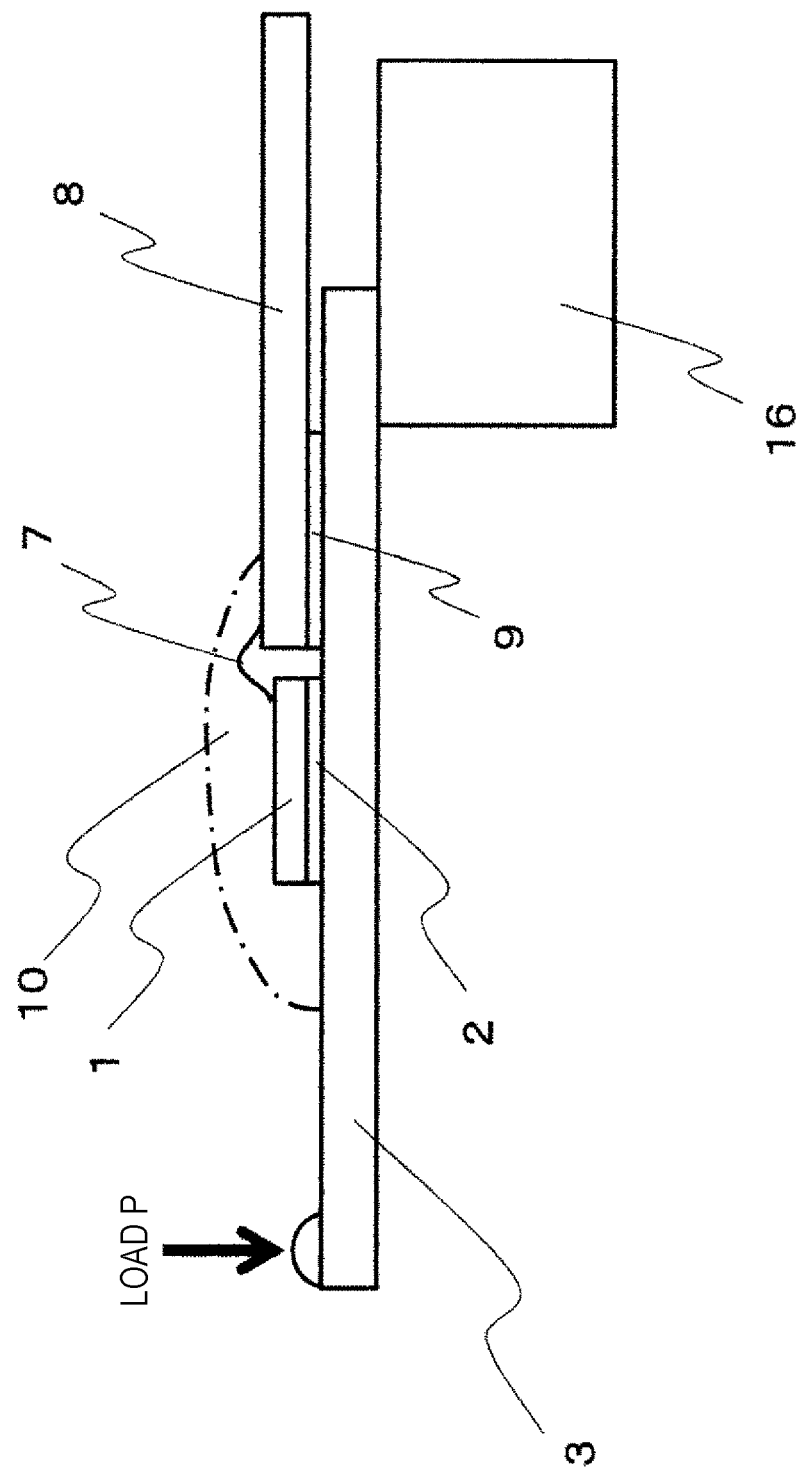
FIG. 8 is a side view illustrating a load cell for load measuring using a strain sensor module.

Next, the strain body 3 will be described. The strain body 3 may have a shape of a structure considering a strain component to be measured and an attachment property of the strain sensor module. In the present embodiment, a flat-shaped member is illustrated. In the case of such a shape, adoption of a cantilever in which one end of the strain body 3 is fixed to a base 16 with an adhesive or the like can be considered as illustrated in FIG. 8. In this case, bending strain is generated in the strain body 3 by a load vertically applied to a tip of the other end. A vertical load value can be estimated by measuring this bending strain. A constituent material of the strain body is not particularly limited, and a metal material, a ceramic material, or the like can be considered. However, in the case where an entire bottom surface of the strain body 3 is fixed to a separate member with an adhesive, or in the case where both ends of the strain body 3 are fixed to a separate member by screwing or spot welding, material quality of the strain body 3 is, desirably, same as material quality of the separate member to be attached. This is to suppress generation of thermal strain caused by a difference of a linear expansion coefficient between the strain body 3 and the separate member when an environment temperature fluctuates.

Second Embodiment

In the present embodiment, a pressure sensor structure will be described as an example in which a shape of a strain body of a strain sensor module is different.

Figure 9:
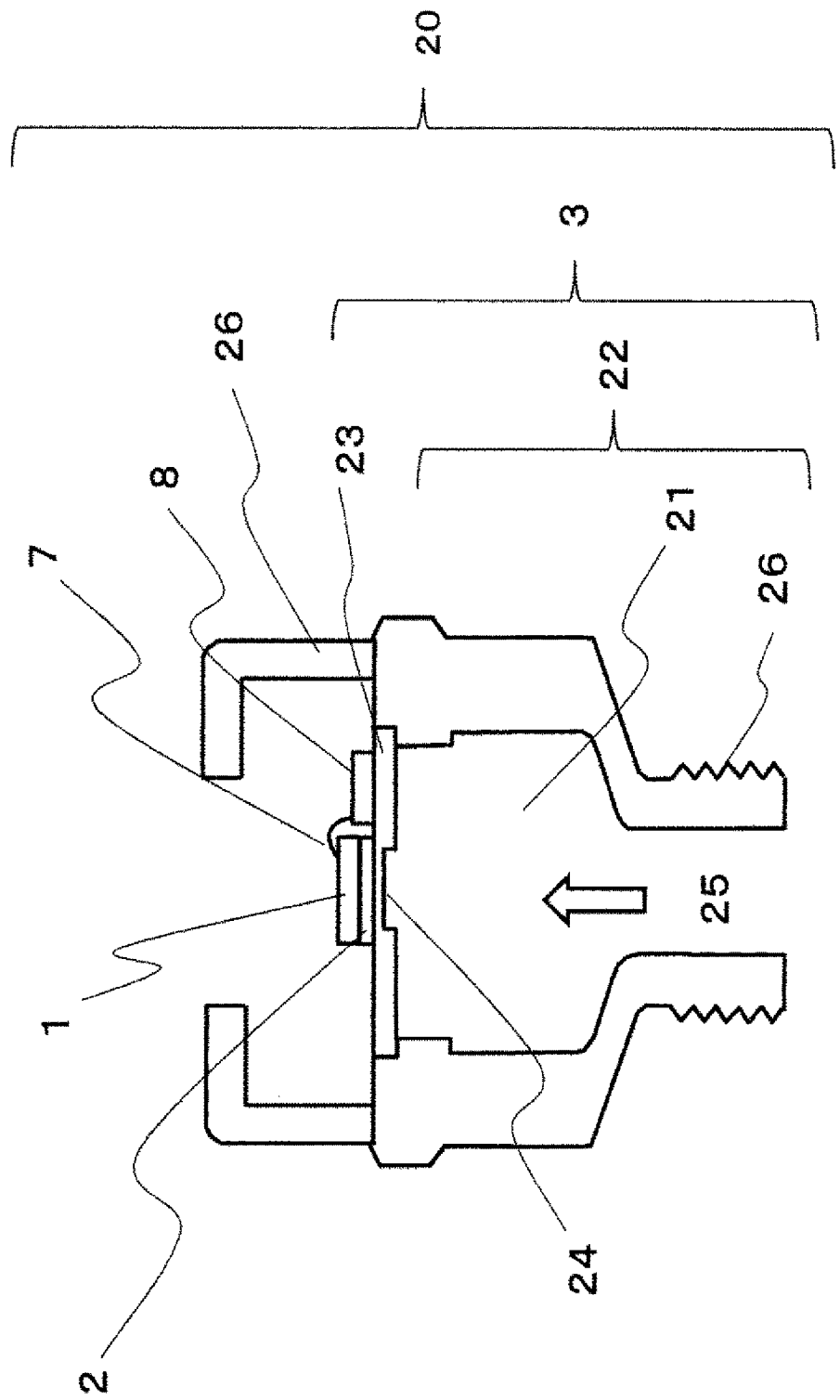
FIG. 9 is a cross-sectional view of a pressure sensor using a strain sensor according to a second embodiment of the present invention.

FIG. 9 is a cross-sectional view of a pressure sensor module of the present embodiment. Basically, a structure is same as that of a first embodiment, but the shape of the strain body is largely different. A pressure sensor module 20 includes: a cylindrical portion 22 having a hollow hole 21 inside thereof; and a strain body 3 consisting of a lid portion 23 adapted to close an upper portion of the hollow hole 21 of the cylindrical portion 22. A strain sensor 1 is mounted, via a joining material 2, on an upper surface of the lid portion 23 above the hollow hole 21, and a groove 24 is formed on a lower surface of the lid portion 23. Additionally, a wiring portion 8 is attached via a wire 7 in order to output a strain detection amount from the strain sensor 1. Furthermore, a case 26 and a connector not illustrated are attached to a periphery in order to protect a peripheral portion of the strain sensor 1 and output a measured value. Meanwhile, a resin or the like is applied to the case 26. The pressure sensor module 20 has a mechanism in which pressure is applied in a direction of an arrow 25 illustrated in FIG. 9, a certain portion of the groove 24 is preferentially deformed, and the pressure can be measured by measuring the deform with the strain sensor 1. The pressure sensor module 20 has a joint portion 26 connected to, for example, a pipe of a hydraulic system of an automobile or the like. Connected to a pipe or the like, pressure inside the pipe is measured.

Figure 10:
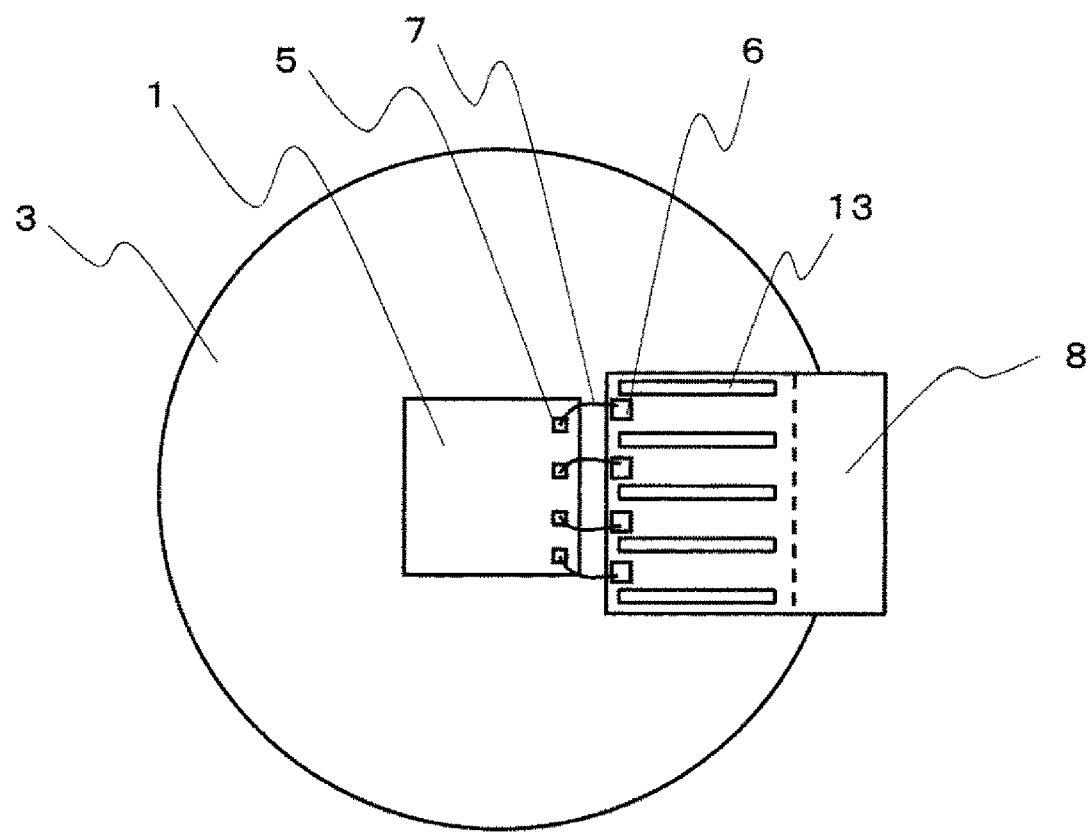
FIG. 10 is a top view of a pressure sensor using the strain sensor according to the second embodiment of the present invention.

FIG. 10 illustrates a top view of the pressure sensor module of the present embodiment. However, the case 26 is not illustrated. Has a structure same as a strain sensor module illustrated in FIG. 5 except that a shape of the strain body 3 is different. Since a slit 13 is provided in the wiring portion 8, force applied to the strain body 3 connected to the wiring portion 8 is little even when the wiring portion 8 absorbs moisture and expands. Therefore, the strain body 3 is hardly deformed, and a sensor output value hardly fluctuates. In other words, pressure measurement accuracy of the pressure sensor module results in no deterioration. Thus, since a zero point fluctuation caused by moisture absorption is little in this pressure sensor module, pressure change can be stably measured with high accuracy for a long period even in a case of use under a high-temperature and high-humidity environment for in-vehicle use.

Third Embodiment

Figure 11:
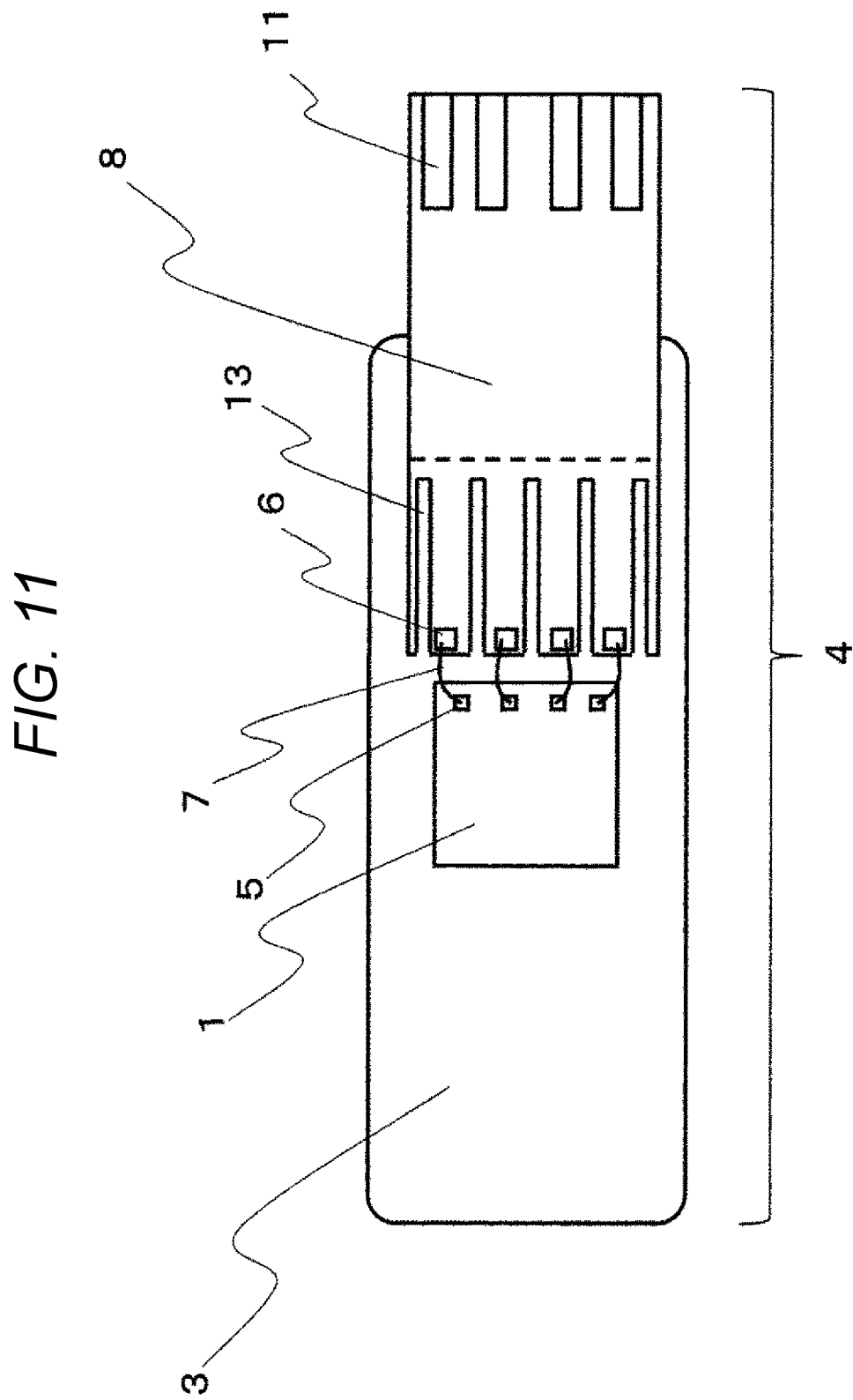
FIG. 11 is a top view of a strain sensor module according to a third embodiment of the present invention.

FIG. 11 is a plan view of a strain sensor module of the present embodiment. Basically, a structure is same as that of a first embodiment, but a shape of a slit 13 provided in a wiring portion 8 is different. The slit 13 in the first embodiment is provided on a more outer side than a position of a terminal 6 of the wiring portion (in other words, a position distant from a strain sensor 1). On the other hand, in the present embodiment, an end portion of the slit extends to an end portion of the wiring portion 8, and the end portion of the wiring portion 8 has a shape like a comb tooth. Compared to the first embodiment, rigidity of the wiring portion 8 in a region in the vicinity of the strain sensor 1 is further decreased, and therefore, fluctuation of sensor output can be further suppressed at the time of moisture absorption. Meanwhile, the slit 13 is manufactured so as not to cut a metal wiring portion (not illustrated) formed in the wiring portion 8 and the terminal 6 of the wiring portion.

Here, a bonding portion 9 may also be provided with a slit having a shape similar to the shape of the slit 13 provided in the wiring portion 8. However, it is absolutely necessary to provide the bonding portion 9 immediately below the terminal 6 of the wiring portion 8. The reason is that: in a case of not providing the bonding portion 9, the terminal 6 of the wiring portion 8 becomes a floating state from the strain body 3, and therefore, wire bonding cannot be applied to the terminal 6 of the wiring portion 8.

Fourth Embodiment

Figure 1:
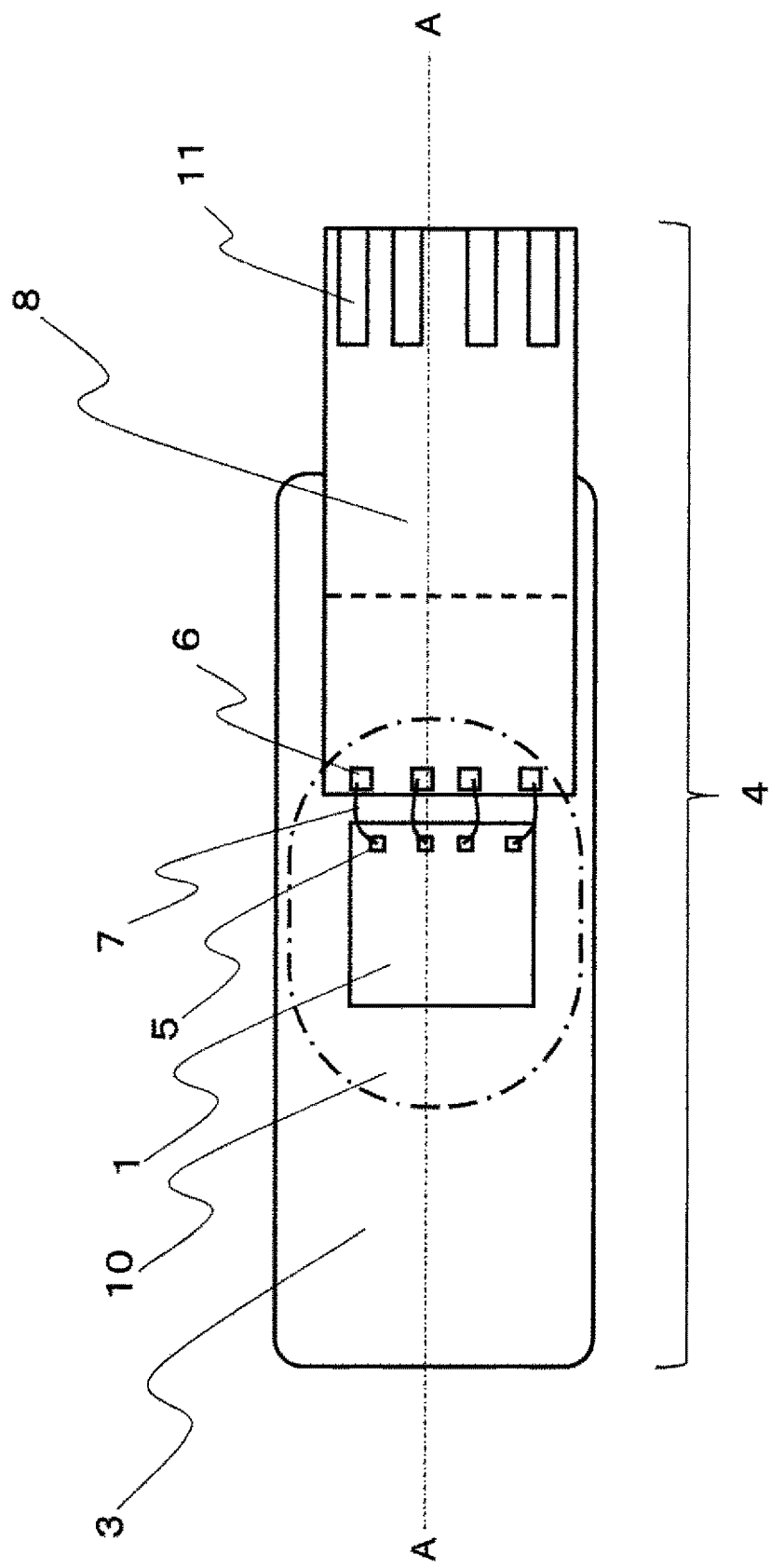
FIG. 1 is a schematic plan view of a strain sensor module in the related art.
Figure 2:
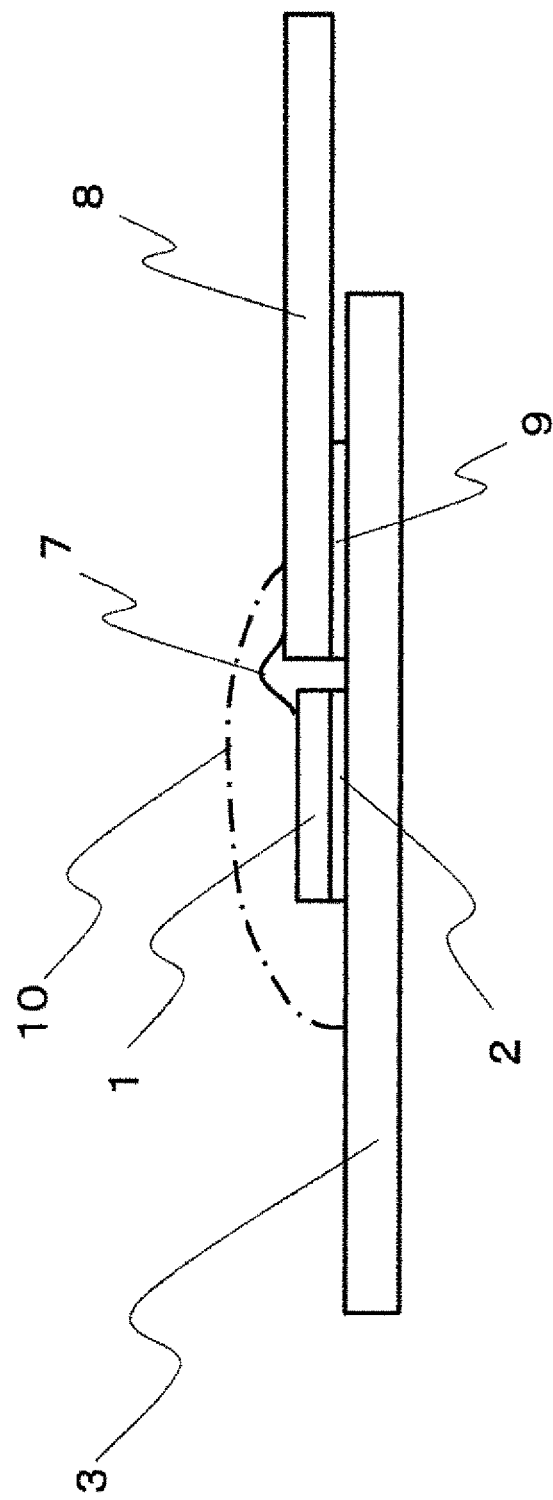
FIG. 2 is a cross-sectional view taken along a line AA in FIG. 1.
Figure 3:
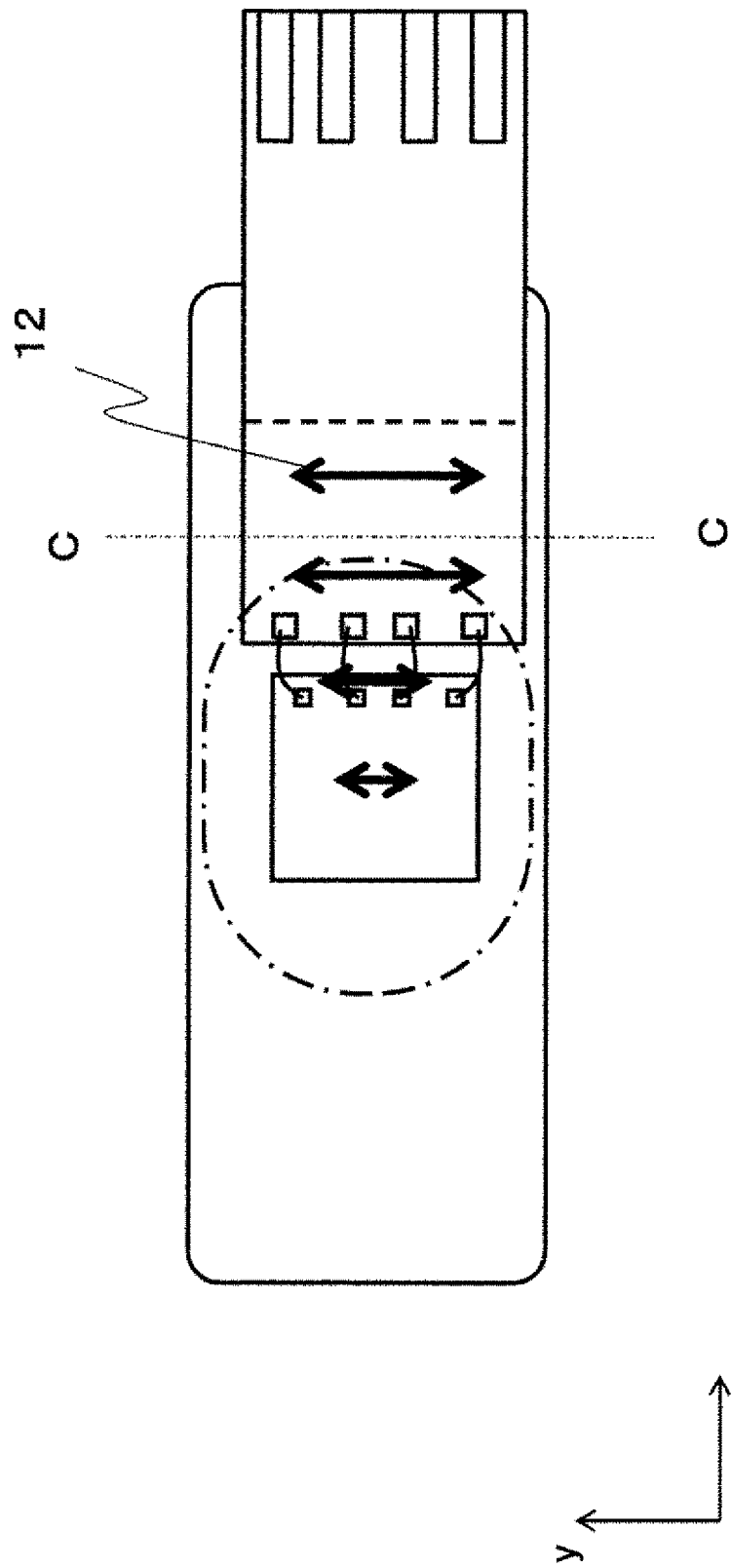
FIG. 3 is a schematic deformed view of a strain sensor module caused by moisture absorption.
Figure 4:
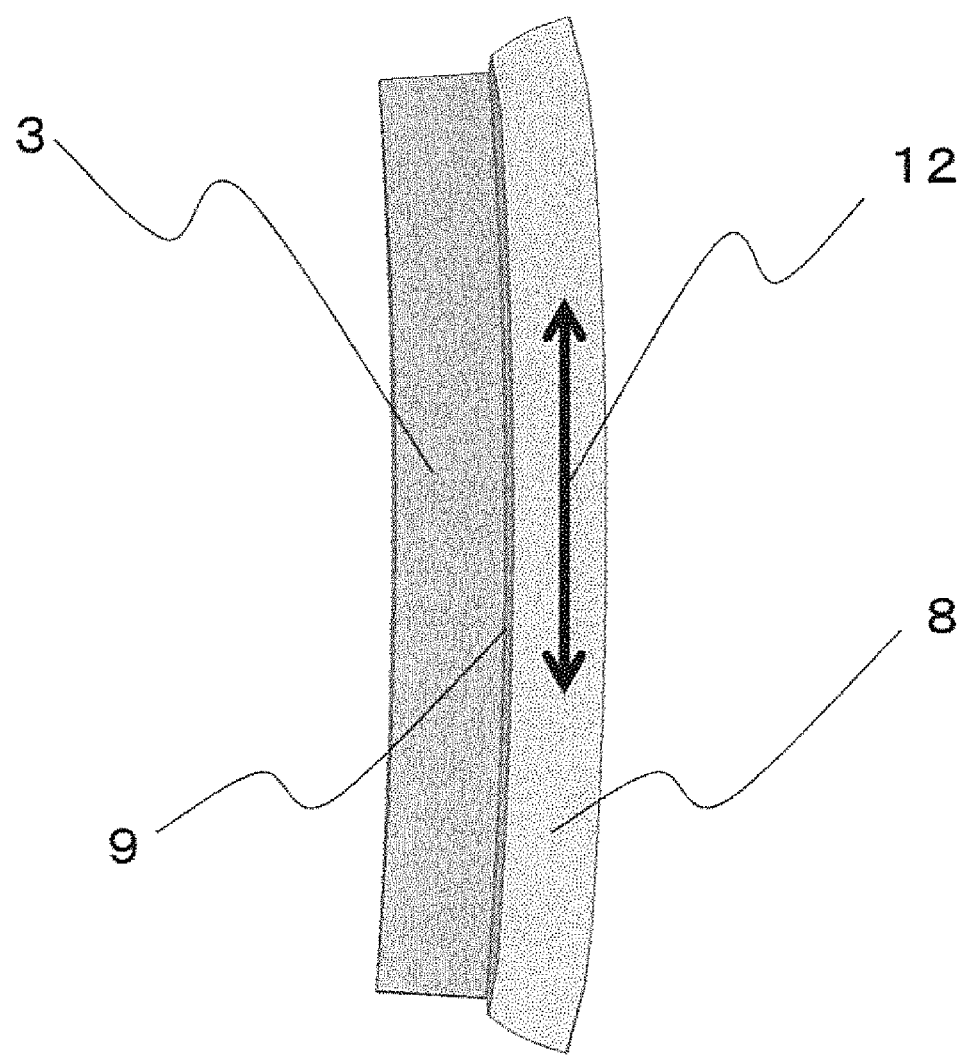
FIG. 4 is a cross-sectional deformed view of the deform taken along a line AA in FIG. 3.
Figure 12:
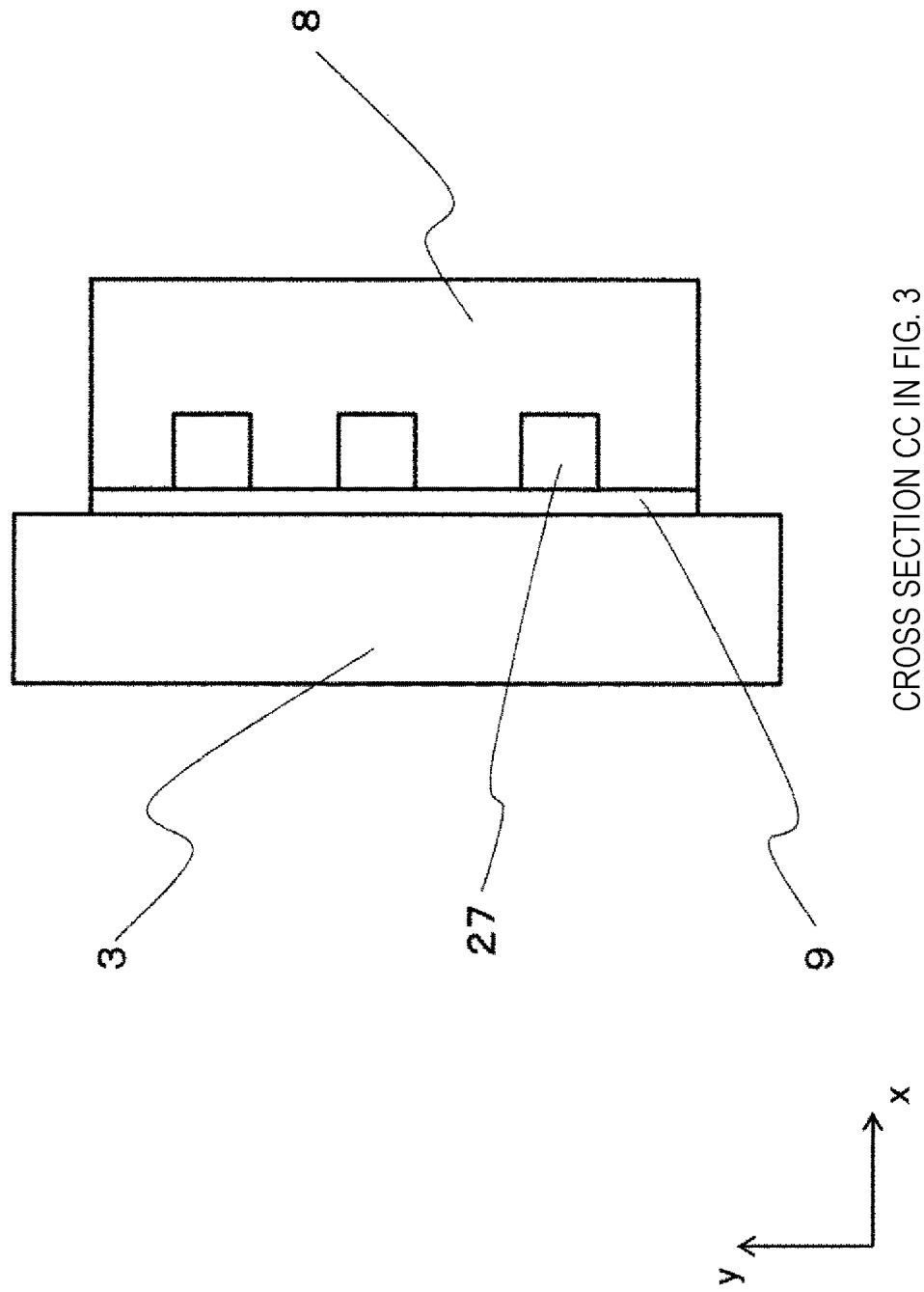
FIG. 12 is a cross-sectional view of a strain sensor module according to a fourth embodiment of the present invention.

A structure of the present embodiment will be described by referring to FIG. 3 and using FIG. 12. FIG. 12 is across-sectional view taken along a line CC in FIG. 3. A basic structure is same as a structure illustrated in FIG. 3, but a cross-sectional structure of a wiring portion 8 is different. As illustrated in FIG. 12, the wiring portion 8 has a groove 27 partly thinned in a thickness direction (X direction in the drawing). In a first embodiment, the groove 27 reaches an upper surface of the wiring portion 8 and completely penetrates the wiring portion, but in present embodiment, the groove does not completely penetrate the same. In comparison with the first embodiment and a third embodiment, rigidity of the wiring portion 8 is larger, and therefore, there is a merit in that handling of the wiring portion 8 becomes easier at the time of attaching the wiring portion 8 to a strain body 3 although an effect to suppress fluctuation of sensor output caused by moisture absorption is little.

Fifth Embodiment

Figure 13:
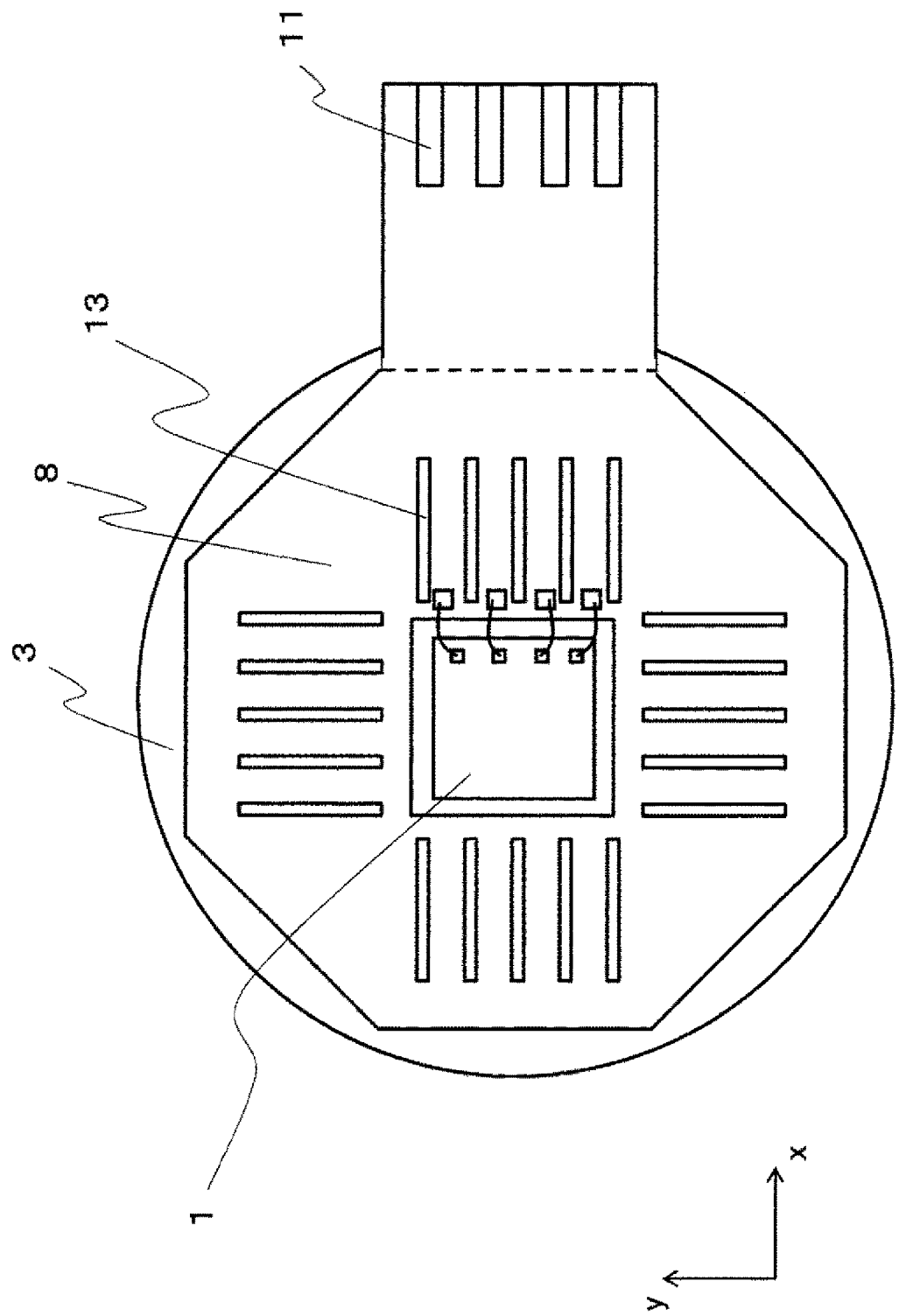
FIG. 13 is a top view of a strain sensor module according to a fifth embodiment of the present invention.

FIG. 13 is a plan view of a strain sensor module of the present embodiment.

Basically, a structure is same as that of a first embodiment, but a shape of a wiring portion 8 is different.

In the first embodiment, a region to provide the wiring portion 8 is only one side of a strain sensor 1 because a size of a strain body 3 is relatively small. In the present embodiment, assumed is a case where the size of the strain body 3 is relatively large. In this case, it can be considered to provide the wiring portions 8 on four sides of the strain sensor 1. As described in the first embodiment, an output value of this strain sensor outputs a difference value between an X direction and a Y direction in the drawing. Therefore, in the case of having a symmetric structure by providing the wiring portions 8 on the four sides of the strain sensor 1, a strain amount in the X direction and that in the Y direction caused by expansion become almost the same when the wiring portions 8 in respective regions on the four sides absorb moisture and expand, and therefore, the sensor output value results in no fluctuation. However, in the case of considering an actual use state, it can be estimated that a symmetric property is deteriorated by uneven attachment positions and uneven thicknesses of the bonding portion 9, and sensor output fluctuates due to expansion caused by moisture absorption. Therefore, fluctuation of sensor output caused by moisture absorption can be suppressed by providing the slits 13 in the respective regions on the four sides of the wiring portion 8 as illustrated in the present embodiment.

REFERENCE SIGNS LIST 1 strain sensor
1a surface
1b back side
2 bonding material
3 strain body
4 strain sensor module
5 chip side electrode pad
6 terminal of wiring portion
7 Au wire 8 wiring portion
9 bonding portion
10 sealing resin
11 terminal portion
12 Y direction tensile strain
13 slit
14 sensor region
15 resistive element
16 base
20 pressure sensor module
21 hollow hole
22 cylindrical portion
23 lid portion
24 groove
25 pressure load
26 case
27 groove

The invention claimed is:

1. A dynamic quantity measuring apparatus comprising:
a strain sensor having a plurality of piezoresistance elements and a plurality of electrode pads formed on a surface of a semiconductor substrate,
a resin member for electrical wiring, provided with a plurality of wires electrically connected to the plurality of electrode pads;
a strain body joined to a back surface of the strain sensor; and
a bonding portion configured to bond the resin member for electrical wiring to the strain body, wherein
a first hole is provided in the resin member,
the first hole has an elongated shape,
a longitudinal axis of the first hole runs along a length of the resin member,
the first hole completely penetrates front and back surfaces of the resin member, and
the first hole is immediately adjacent to a terminal which is wired directly to one of the plurality of electrode pads of the strain sensor, the terminal being separated from the one of the plurality of electrode pads by a distance along the longitudinal direction of the dynamic quantity measuring apparatus, so that the terminal does not directly overlap the one of the plurality of electrode pads.

2. The dynamic quantity measuring apparatus according to claim 1, wherein
a longitudinal direction of the first hole is formed in a direction perpendicular to the strain sensor.

3. The dynamic quantity measuring apparatus according to claim 1, wherein
a second hole is also provided in a region of the bonding portion located in the vicinity of the strain sensor.

4. The dynamic quantity measuring apparatus according to claim 3, wherein
a longitudinal direction of the second hole provided in the region of the bonding portion is formed in a direction perpendicular to the strain sensor.

5. The dynamic quantity measuring apparatus according to claim 3, wherein
the second hole provided in the bonding portion has a slit shape completely penetrating the bonding portion.

6. The dynamic quantity measuring apparatus according to claim 1, wherein
the first hole reaches an end portion of the resin member for electrical wiring located in the vicinity of the strain sensor, and the end portion of the resin member for electrical wiring has a shape like a comb tooth.

7. The dynamic quantity measuring apparatus according to claim 1, wherein
the resin member for electrical wiring is formed in a region in the vicinity of each of four sides of the strain sensor, and additional holes are provided in a region in the vicinity of each of four sides.

8. The dynamic quantity measuring apparatus according to claim 1, wherein the plurality of electrode pads and the plurality of wires are electrically connected via a plurality of Au wires.

* * * * *